United States Patent
Hsu et al.

(10) Patent No.: US 8,446,721 B2
(45) Date of Patent: May 21, 2013

(54) LATCH MECHANISM FOR LATCHING A MONITOR OF A PORTABLE COMPUTER AND PORTABLE COMPUTER THEREOF

(75) Inventors: Po-Yuan Hsu, Taipei Hsien (TW); Chia-Min Sun, Taipei Hsien (TW); Hsing-Wang Chang, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 423 days.

(21) Appl. No.: 12/757,054

(22) Filed: Apr. 9, 2010

(65) Prior Publication Data

US 2010/0302721 A1    Dec. 2, 2010

(30) Foreign Application Priority Data

Jun. 2, 2009 (TW) .............................. 98118169 A

(51) Int. Cl.
*H05K 5/00* (2006.01)
*H05K 7/00* (2006.01)
*G06F 1/16* (2006.01)

(52) U.S. Cl.
USPC ............. 361/679.58; 361/679.55; 361/679.56

(58) Field of Classification Search
USPC ............. 361/679.58, 679.21, 679.26, 679.55, 361/679.56
See application file for complete search history.

(56) References Cited

U.S. PATENT DOCUMENTS

| | | | |
|---|---|---|---|
| 6,118,653 A | 9/2000 | Kim | |
| 6,353,529 B1 * | 3/2002 | Cies | 361/679.05 |
| 6,942,153 B1 * | 9/2005 | Yuan et al. | 235/472.01 |
| 7,920,378 B2 * | 4/2011 | Mihara et al. | 361/679.55 |
| 7,929,298 B2 * | 4/2011 | Hsu | 361/679.59 |
| 8,035,481 B2 * | 10/2011 | Krah | 340/7.58 |
| 8,081,446 B2 * | 12/2011 | Hsu | 361/679.55 |

FOREIGN PATENT DOCUMENTS

TW     M348199     1/2009

* cited by examiner

*Primary Examiner* — Anthony Haughton
(74) *Attorney, Agent, or Firm* — Winston Hsu; Scott Margo

(57) ABSTRACT

A latch mechanism includes a housing pivoted to a screen. A transparent portion is formed on the housing. The latch mechanism further includes a light source installed inside the housing for emitting light into the transparent portion of the housing, a waterproof unit installed inside the housing for covering the light source so as to provide waterproof function for the light source, a conductive wire connected to the light source for providing electricity to the light source, and a frame installed inside the housing and connected to the waterproof unit for supporting the conductive wire.

18 Claims, 3 Drawing Sheets

LATCH MECHANISM FOR LATCHING A MONITOR OF A PORTABLE COMPUTER AND PORTABLE COMPUTER THEREOF

BACKGROUND OF THE INVENTION

1. Field of the Invention

The present invention relates to a latch mechanism for latching a monitor of a portable computer, and more particularly, to a latch mechanism for latching a monitor of a portable computer with waterproof and illumination functions.

2. Description of the Prior Art

In general, illumination mechanism for lighting a keyboard of a notebook includes a backlight module of the keyboard, a light disposed on a side of an LCD monitor, an external light connected to the notebook, and so on. However, the backlight module of the keyboard has disadvantages of complicated mechanical design and high cost. The light disposed on the side of the LCD monitor occupies inner space of the LCD monitor and increases size of the LCD monitor. It's opposite to the trend of compact and slim size and light weight of the notebook and increases manufacturing labor and cost. Additionally, the complicated structure can not provide well waterproof function. The external light connected to the notebook causes inconvenience of carriage, and the consumer has to purchase the accessory external light especially. Therefore, there is a need to improve mechanical design of the lighting device equipped on the portable computer.

SUMMARY OF THE INVENTION

The present invention provides a latch mechanism for latching a monitor of a portable computer with waterproof and illumination functions for solving above drawbacks.

According to the claimed invention, a latch mechanism includes a housing pivoted to a screen. A transparent portion is formed on the housing. The latch mechanism further includes a light source installed inside the housing for emitting light into the transparent portion of the housing, a waterproof unit installed inside the housing for covering the light source so as to provide waterproof function for the light source, a conductive wire connected to the light source for providing electricity to the light source, and a frame installed inside the housing and connected to the waterproof unit for supporting the conductive wire.

According to the claimed invention, a portable computer includes a host, a screen pivoted to the host, and a latch mechanism connected to the screen for latching the screen on the host. The latch mechanism includes a housing pivoted to the screen. A transparent portion is formed on the housing. The latch mechanism includes a light source installed inside the housing for emitting light into the transparent portion of the housing, a waterproof unit installed inside the housing for covering the light source so as to provide waterproof function for the light source, a conductive wire connected to the light source for providing electricity to the light source, and a frame installed inside the housing and connected to the waterproof unit for supporting the conductive wire.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
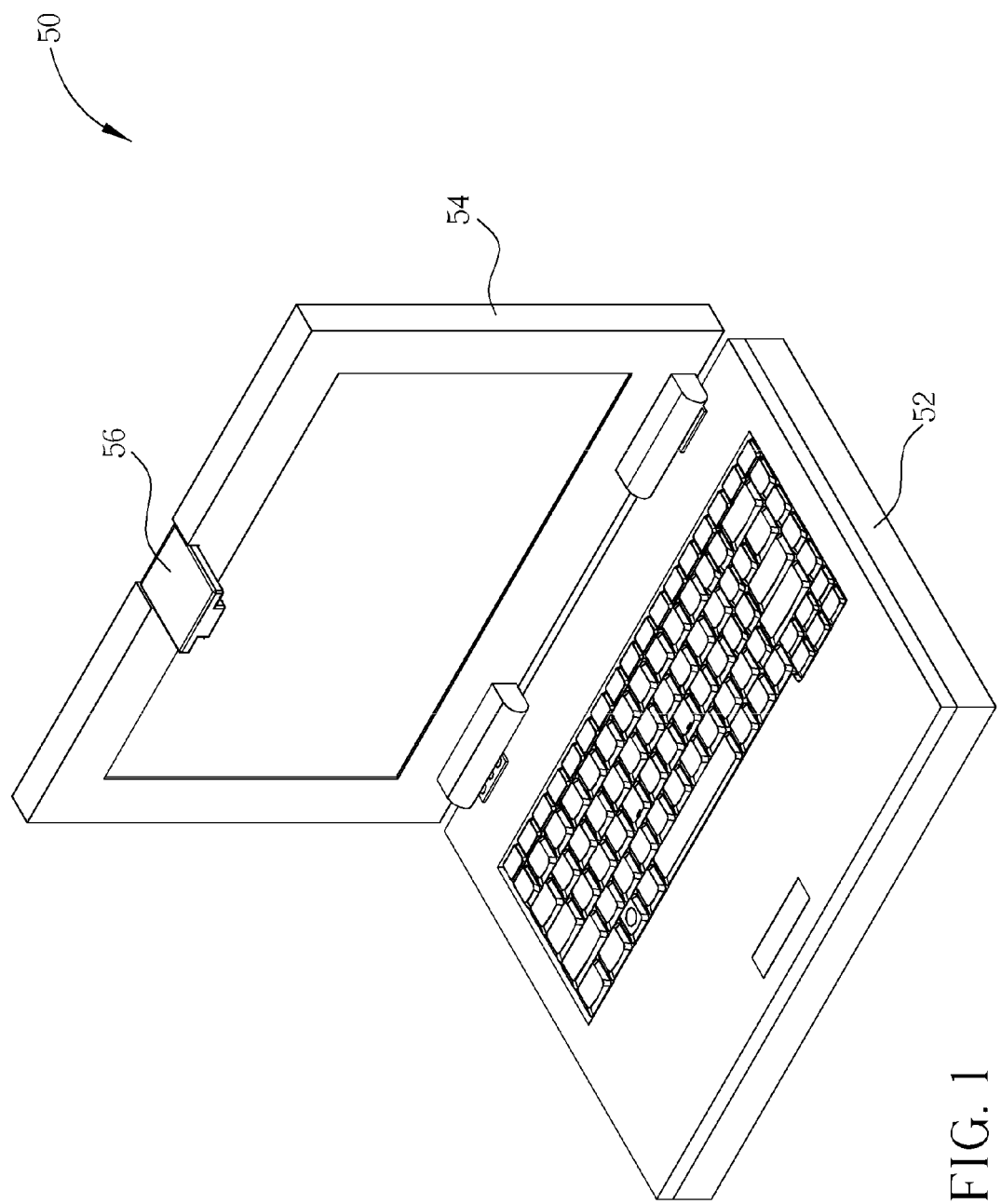
FIG. 1 is a schematic drawing of a portable computer according to a preferred embodiment of the present invention.
Figure 2:
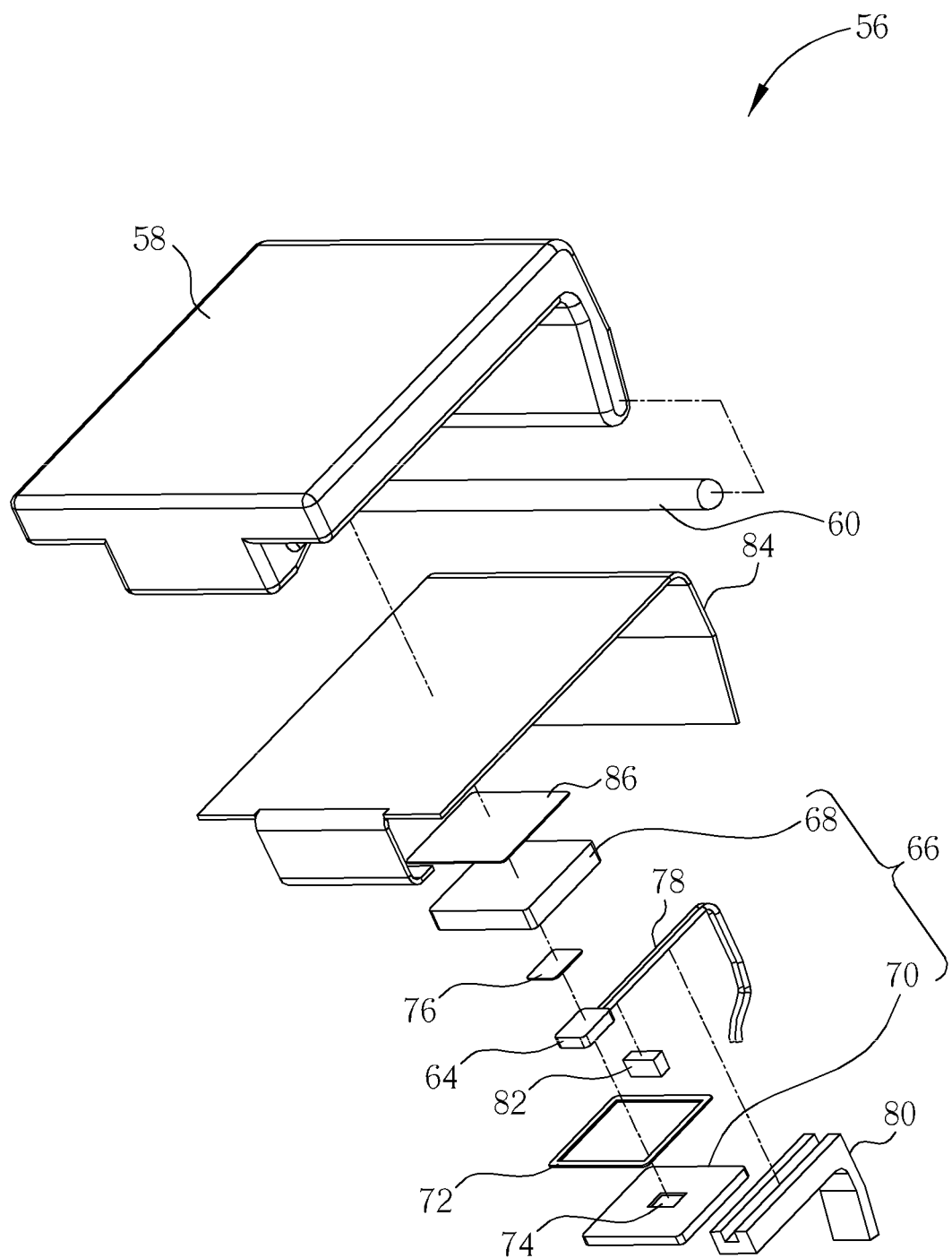
FIG. 2 is an exploded drawing of a latch mechanism according to the preferred embodiment of the present invention.
Figure 3:
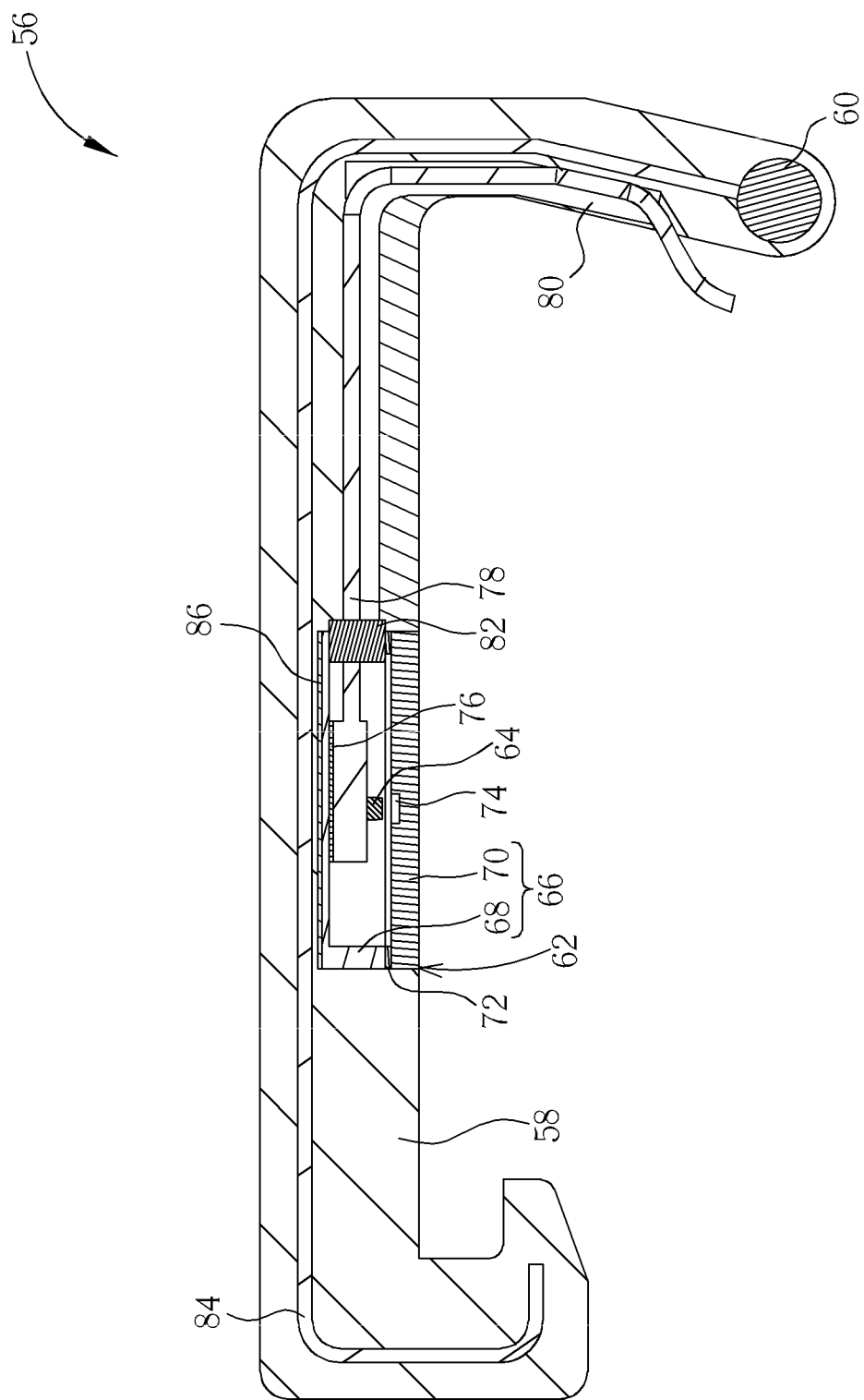
FIG. 3 is a sectional view of the latch mechanism according to the preferred embodiment of the present invention.

Please refer to FIG. 1. FIG. 1 is a schematic drawing of a portable computer 50 according to a preferred embodiment of the present invention. The portable computer 50 can be a notebook computer. The portable computer 50 includes a host 52, and a screen 54 pivoted to the host 52. The portable computer 50 further includes a latch mechanism 56 connected to the screen 54 for latching the screen 54 on the host 52. The latch mechanism 56 not only can latch the screen 54 on the host 52 but also has waterproof and illumination functions. Please refer to FIG. 2 and FIG. 3. FIG. 2 is an exploded drawing of the latch mechanism 56 according to the preferred embodiment of the present invention. FIG. 3 is a sectional view of the latch mechanism 56 according to the preferred embodiment of the present invention. The latch mechanism 56 includes a housing 58 pivoted to the screen 54 via a shaft 60 so that the latching mechanism 56 is capable of rotating relative to the screen 54 for adjusting illumination angle and region, such as for illuminating a keyboard of the host 52. The housing 58 is for covering internal components of the latch mechanism 56. The housing 58 can be made of plastic or rubber material for providing waterproof function. A transparent portion 62 is formed on the housing 58, and the transparent portion 62 can be an opening. The latch mechanism 56 further includes a light source 64 installed inside the housing 58 for emitting light into the transparent portion 62 of the housing 58 so as to provide illumination function. The light source 64 can be a light emitting diode (LED).

The latch mechanism 56 further includes a waterproof unit 66 installed inside the housing 58 for covering the light source 64 so as to provide waterproof function for the light source 64. For example, if the transparent portion 62 is an opening, the waterproof unit 66 can be wedged inside the opening. The waterproof unit 66 includes a waterproof cover 68 and a waterproof plate 70 for covering the light source 64 with the waterproof cover 68. The waterproof cover 68 and the waterproof plate 70 can be glued with an adhesive layer 72 therebetween or combined with other mechanism. A transparent region 74 is formed on the waterproof plate 70, and the light emitting from the light source 64 can pass through the transparent region 74 on the waterproof plate 70 for providing illumination function. Furthermore, the light source 64 and the waterproof cover 68 can be glued with an adhesive layer 76 therebetween or combined with other mechanism.

The latch mechanism 56 further includes a conductive wire 78 connected to the light source 64 for providing electricity or transmitting signals to the light source 64. The latch mechanism 56 further includes a frame 80 installed inside the housing 58 and connected to the waterproof unit 70 for supporting and containing the conductive wire 78. The waterproof unit 66 further includes a waterproof pad 82 disposed in a position where the conductive wire 78 passes through the waterproof cover 68, that is the junction of the waterproof cover 68 and the frame 80. The waterproof pad 82 can be an elastic structure, such as a waterproof sponge, so that the waterproof pad 82 can be tightly wedged inside an opening of the waterproof cover 68 where the conductive wire 78 passes through for preventing fluid from leaking inside the waterproof cover 68. The latch mechanism 56 further includes a base 84 installed inside the housing 58 for supporting the waterproof unit 66 and the frame 80. The base 84 can be a metal plate. The waterproof cover 68 and the base 84 can be glued with an adhesive layer 86 therebetween or combined with other mechanism.

The assembly of the latch mechanism 56 is introduced as follows. First the light source 64 and part of the conductive wire 78 are disposed inside the waterproof unit 66, then the waterproof unit 66 and the frame 80 are installed on the base 84, and the base 84 is installed inside the housing 58 of the latch mechanism 56 so as to finish assembly of the latch mechanism 56. At last the latch mechanism 56 is disposed on the screen 54, and the conductive wire 78 is connected to a circuit board inside the screen 54. The latch mechanism 56 can provide waterproof and illumination functions.

In contrast to prior art, the latch mechanism of the present invention combines the waterproof unit and the light source so as to reduce manufacturing labor and cost. Furthermore, the light source is integrated with the latch so that there is no need to reserve extra space of the LCD monitor to dispose the light source and the size of the LCD monitor can be reduced. The waterproof design of the latch mechanism of the present invention can conform to a strict standard, such as the standard of the military notebook, as an improved product design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A latch mechanism comprising:
   a housing pivoted to a screen, and a transparent portion being formed on the housing;
   a light source installed inside the housing for emitting light into the transparent portion of the housing;
   a waterproof unit installed inside the housing, the waterproof unit comprising a waterproof cover and a waterproof plate for covering the light source with the waterproof cover, so as to provide waterproof function for the light source;
   a conductive wire connected to the light source for providing electricity to the light source; and
   a frame installed inside the housing and connected to the waterproof unit for supporting the conductive wire.

2. The latch mechanism of claim 1 wherein the transparent portion is an opening and the waterproof unit is wedged inside the opening.

3. The latch mechanism of claim 1 wherein the light source is a light emitting diode (LED).

4. The latch mechanism of claim 1 wherein a transparent region is formed on the waterproof plate, and the light emitting from the light source can pass through the transparent region on the waterproof plate.

5. The latch mechanism of claim 1 wherein the waterproof unit further comprises a waterproof pad disposed in a position where the conductive wire passes through the waterproof cover for preventing fluid from leaking inside the waterproof cover.

6. The latch mechanism of claim 1 wherein the waterproof cover and the waterproof plate are glued with each other.

7. The latch mechanism of claim 1 wherein the light source and the waterproof cover are glued with each other.

8. The latch mechanism of claim 1 further comprising a base installed inside the housing for supporting the waterproof unit and the frame.

9. The latch mechanism of claim 8 wherein the waterproof unit and the base are glued with each other.

10. A portable computer comprising:
    a host;
    a screen pivoted to the host; and
    a latch mechanism connected to the screen for latching the screen on the host, the latch mechanism comprises:
      a housing pivoted to the screen, and a transparent portion being formed on the housing;
      a light source installed inside the housing for emitting light into the transparent portion of the housing;
      a waterproof unit installed inside the housing, the waterproof unit comprisin a waterproof cover and a waterproof plate for covering the light source with the waterproof cover, so as to provide waterproof function for the light source;
      a conductive wire connected to the light source for providing electricity to the light source; and
      a frame installed inside the housing and connected to the waterproof unit for supporting the conductive wire.

11. The portable computer of claim 10 wherein the transparent portion is an opening and the waterproof unit is wedged inside the opening.

12. The portable computer of claim 10 wherein the light source is a light emitting diode (LED).

13. The portable computer of claim 10 wherein a transparent region is formed on the waterproof plate, and the light emitting from the light source can pass through the transparent region on the waterproof plate.

14. The portable computer of claim 10 wherein the waterproof unit further comprises a waterproof pad disposed in a position where the conductive wire passes through the waterproof cover for preventing fluid from leaking inside the waterproof cover.

15. The portable computer of claim 10 wherein the waterproof cover and the waterproof plate are glued with each other.

16. The portable computer of claim 10 wherein the light source and the waterproof cover are glued with each other.

17. The portable computer of claim 10 further comprising a base installed inside the housing for supporting the waterproof unit and the frame.

18. The portable computer of claim 10 wherein the waterproof unit and the base are glued with each other.

* * * * *